United States Patent

[11] 3,554,394

| | | |
|---|---|---|
| [72] | Inventor | John Gunnar Hedman<br>58 Loerholmsraegen, Pitea, Sweden |
| [21] | Appl. No. | 709,393 |
| [22] | Filed | Feb. 29, 1968 |
| [45] | Patented | Jan. 12, 1971 |
| [32] | Priority | Mar. 6, 1967 |
| [33] | | Sweden |
| [31] | | 3010/67 |

[54] TRAILER AND METHOD FOR LOADING AND UNLOADING THE SAME, IN WHICH ONLY ONE WORKMAN NEED BE USED TO CARRY OUT THE METHOD
6 Claims, 8 Drawing Figs.

[52] U.S. Cl. ................................................ 214/38,
214/152, 214/390, 214/501, 280/414
[51] Int. Cl. ........................................................B65g 67/02,
B62d 63/06
[50] Field of Search ........................................ 214/38, 46,
152, 501, 515, 396, 390, 84, 505, 506; 280/414

[56] References Cited
UNITED STATES PATENTS

| | | | |
|---|---|---|---|
| 3,043,459 | 7/1962 | Whalen ........................ | 214/506 |
| 3,077,276 | 2/1963 | Thwreatt ...................... | 214/84 |
| 3,131,902 | 5/1964 | Zak ............................... | 280/414 |
| 831,686 | 9/1906 | Sayward ....................... | 214/38(.46) |
| 2,822,100 | 2/1958 | Pesta ............................. | 214/396 |

*Primary Examiner*—Robert G. Sheridan
*Attorney*—Sughrue, Rothwell, Mion, Zinn & Macpeak ABSTRACT: A boat trailer having a U-shaped chassis, when loaded by one man, is moved thus passing the U-legs of the chassis beyond and on either side of the shoring member or members supporting the boat, whereupon removable support stocks are introduced into holes in the U-legs so as to interconnect said legs, thus enabling to lift the boat first at the stave and then at the stern by means of hydraulic means regulating the angle between the coupling arm of the trailer and the chassis to which said arm is pivoted.

TRAILER AND METHOD FOR LOADING AND UNLOADING THE SAME, IN WHICH ONLY ONE WORKMAN NEED BE USED TO CARRY OUT THE METHOD

The invention is concerned with a trailer for use in conjunction with transporting, for instance, boats, and which also includes especially adapted equipment associated with said trailer, this equipment enabling one man to load and unload, for instance, a boat onto and off the trailer. A number of types of trailers are known with which it is possible to unload a boat direct from the trailer, or conversely to load the boat direct onto said trailer. However, in the case of these arrangements it is only possible for one man to load and unload a boat onto and from the trailer if the boat is relatively light. Furthermore, prior art boat trailers capable of being operated by one man are primarily intended for boats not provided with salient keels.

The present invention is concerned with a particularly expedient arrangement by means of which it is possible for one man to load and unload freight, in the form of a boat for instance, of considerable weight onto and from a trailer, on which the load is shored or propped, by means of support members, and possibly supported at three points; it being possible also to use the trailer for transporting different kinds of containers, for instance.

The invention is mainly characterized in that at least a part of the trailer chassis is essentially U-shaped and presents horizontal leg members which, as the trailer is inserted in under the load, are intended to be passed beyond and on either side of one of the members supporting said load and provided with detachable load-supporting stocks extending between the leg members, and is pivotally arranged about a horizontal shaft substantially at right angles to the leg members; in which chassis portion a coupling arm or the like is arranged vertically rotatable and in that the coupling arm and/or said chassis portion are capable of being connected to an operating mechanism by means of which the size of the angle presented in a vertical plane between the long axis of the chassis portion and the long axis of the coupling arm can be adjusted.

In accordance with an advantageous further development of the invention the U-shaped chassis member constitutes the entire chassis and is pivotally arranged around a divided shaft supported on wheels. The chassis is suitably provided for this purpose with collapsible side support members and changeable load supporting stocks suited for different kinds of freight.

The invention is also concerned with suitable propping or shoring means, comprising load support stocks presenting a height adapted for different purposes and being of such a breadth that they can be inserted between the legs of the U-shaped chassis member, and having a load support stock provided with collapsible side supports and being of greater breadth, preferably of the same breadth as the trailer.

An embodiment of the invention will now be described with reference to the accompanying drawings, wherein.

Figure 1:
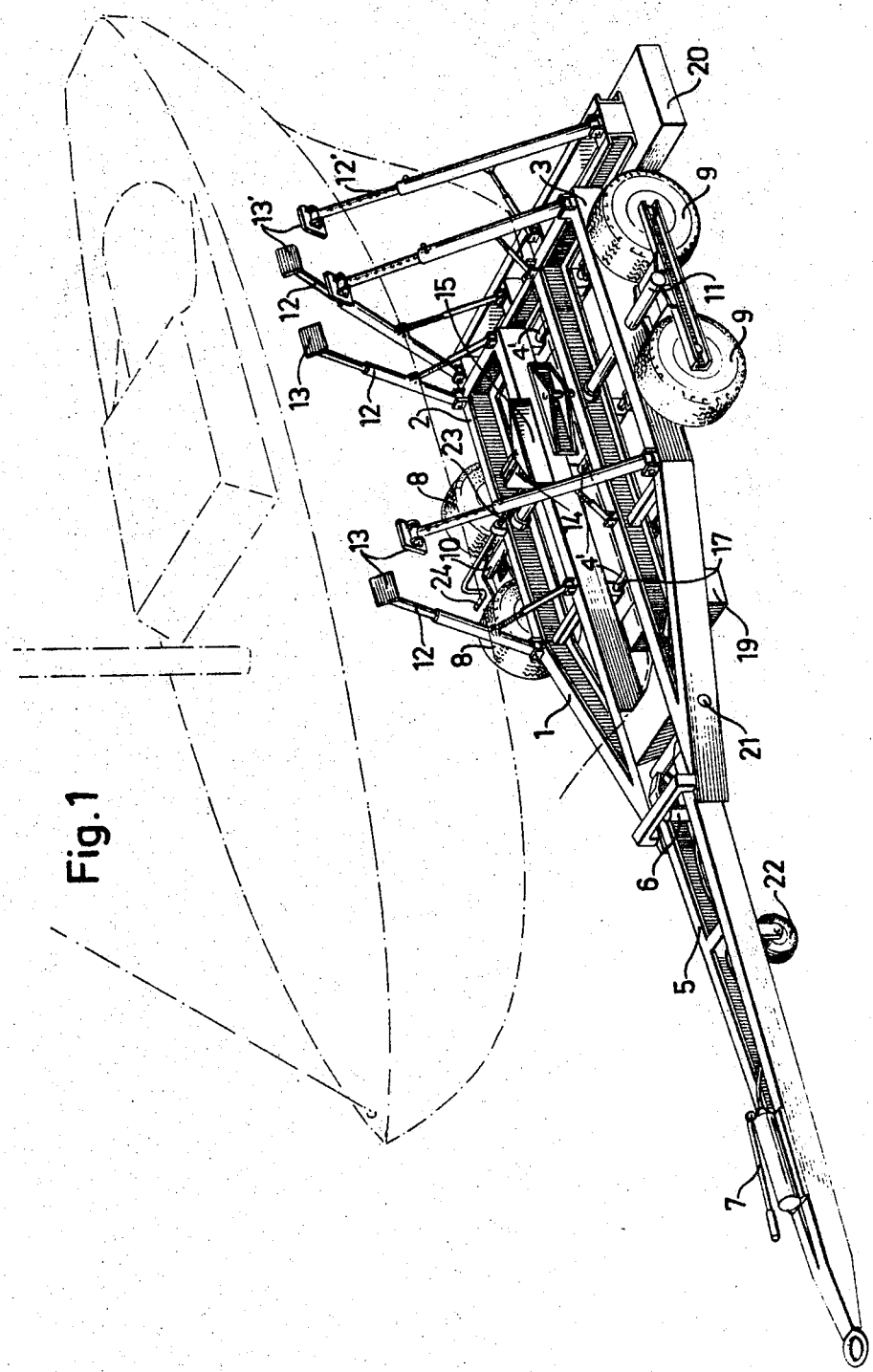
FIG. 1 shows a trailer according to the invention carrying a boat, indicated in outline only.
Figure 2:
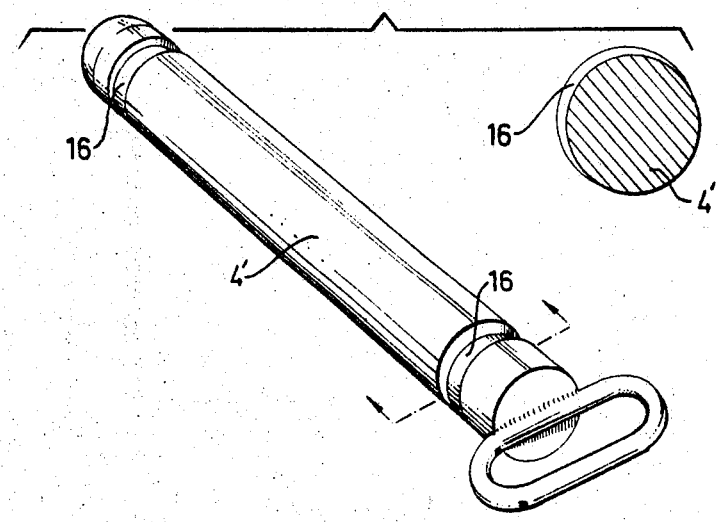
FIG. 2 shows a load supporting stock in the form of a beam.
Figure 3:
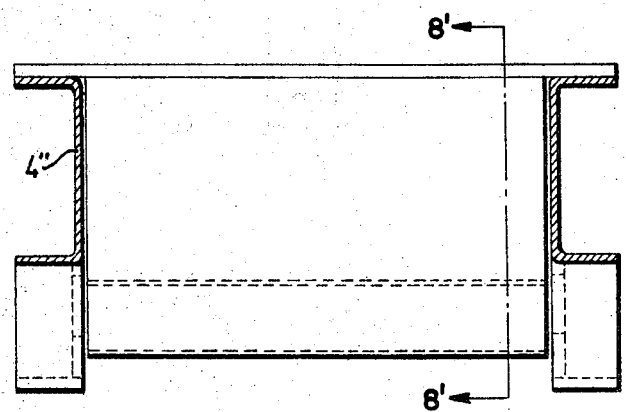
FIG. 3 shows a load supporting stock in the form of a keel trestle.
Figure 8:
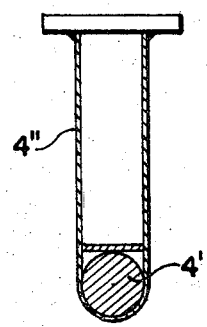
FIG. 8 illustrates a view of the keel trestle taken along lines 8'-8'<~ of FIG. 3.

FIG. 1 shows for the chassis comprising: a trailer has been designed in the shape of a U presenting substantially horizontal leg members, which enables a trailer to be inserted in under, for instance, a propped or shored boat, container or the like, the leg members being passed beyond one of the support stocks 19 supporting the load on either side of said support stocks. The stocks are for this purpose so dimensioned that they fit in between the two leg members 2, 3 of the U-shaped chassis. The chassis is arranged sn a divided shaft 10, 11, so that the position of said chassis relative the horizontal can be changed, i.e. be made to slope backwards or forwards, the two portions of the shaft being supported by wheels 8, 9. To permit the trailer to be coupled to a towing vehicle, the front portion of the trailer is provided with an arm 5 which is secured, for instance, by a shaft 21 in the chassis for rotation in at least a vertical direction. Arranged on the coupling arm 5 is a vertically adjustable wheel 22. The magnitude of the angle presented in a vertical plane between the long axis of the arm 5 and the long axis of the chassis 1 can be adjusted by an operating mechanism 6, 7 comprising a hydraulic cylinder 6 and a jack 7.

The chassis is also provided with a number of collapsible, preferably telescopic side supporting members 12, each of which is provided with an adjustable support pad 13. Also arranged on the chassis is a keel support 14, comprising an adjustable support plate 15, and a screw 23 and a handle 24 by means of which said plate is actuated. Included in the propping or shoring equipment associated with the trailer is also a load supporting member 4, which, depending upon the type of boat being transported on the trailer, may comprise a beam 4' provided with an eccentric groove 16, or a keel support trestle 4''. The load supporting member 4 is mounted in appropriate openings 17 in the U-shaped frame and is capable of supporting the keel of a boat or of locking keel trestles 4' onto the U-shaped chassis to permit the trailer to carry boats having shallow keels. Also provided are a number of support stocks 19, which are also of different design, depending upon the type of load to be carried by the trailer. For instance, stocks of greater height are required when unloading a motor launch than when unloading a sailing craft. In addition to the stocks 19 a stock 20 is also provided, the stock 20 being considerably wider than the stocks 19. Arranged on the stock 20 are side supporting members 12', also preferably of the telescopic type, which are provided with adjustable support pads 13'.

The present invention is also concerned with a method for loading and unloading boats and other articles, for instance containers, onto and from the trailer. The method will now be described with reference to FIGS. 4—7.

Figure 4:
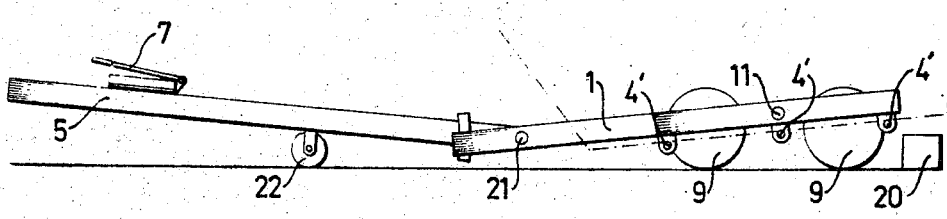
FIGS. 4 and 5 illustrate two different instances in the unloading of a boat from the trailer.
Figure 5:
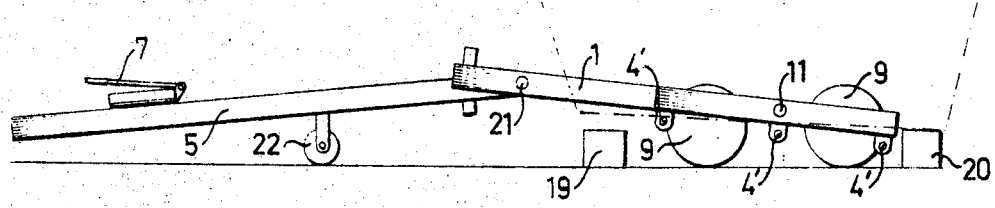

When unloading a sailing boat from a trailer according to the invention by means of a crane or the like the trailer chassis is brought into line with the coupling arm 5 by means of the operating mechanism 6, 7, and the wheel 22 is lowered to the ground. The hydraulic cylinder 6 is actuated by the jack 7 in such a way that the chassis adopts a position wherein it slopes downwards in a direction towards the coupling arm 5 (as shown in FIG. 4) so that the support stock 20 can be positioned under the rearmost portion of the keel, whereafter by means of the operating mechanism 6, 7 the chassis is caused to adopt a position wherein it slopes in a direction downwards from the coupling arm 5 (as shown in FIG. 5), whereupon the keel rests on the foremost of the support members 4' and against the stock 20. The keel is thus free of the remaining support members 4', which after being rotated about their longitudinal axis through 180° can be removed through the openings 17. With the trailer in this position the side supporting members 12' are mounted on the stock 20, bearing loosely against the side of the boat; a support stock 19 is inserted under the foremost portion of the keel and the keel support 14 is removed. Subsequent to adjusting the chassis to substantially a horizontal position by means of the operating device 6, 7, whereupon the stocks 19, 20 bear the full weight of the boat, the side supporting members 12' can be made to bear tightly against the sides of the boat and the remaining side supporting members 12 and the last of the support members 4'' can be removed. The trailer can then be moved away from the site.

The same sequence of events is adopted when unloading a motor boat, with the exception that the keel support may possibly not be required, and that the members 4' are replaced by the keel trestles 4''.

When loading boats shored or propped in the manner obtained when unloading according to the aforegoing the same method of procedure is adopted as that described, but with the exception that all the measures are inverted and effected in a reverse order.

Figure 6:
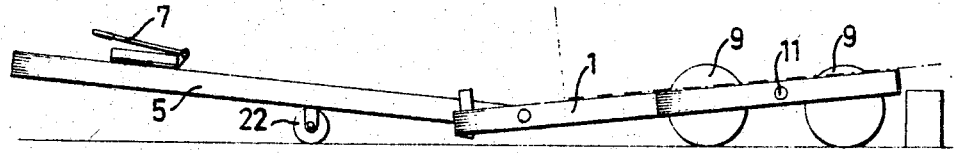
FIGS. 6 and 7 illustrate two different instances in the unloading of a container from the trailer.
Figure 7:
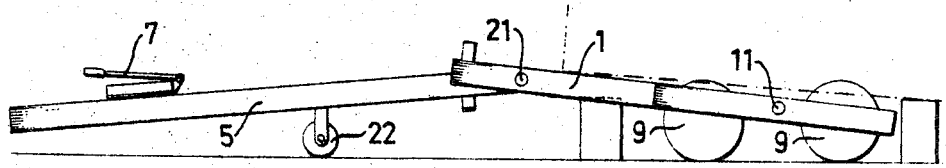

As mentioned earlier a trailer according to the invention can be used for transporting, for instance, a container, wherein the work of loading and unloading can also be carried out by one man in this instance. In the case of containers, however, the side supporting members 12 and the keel support 14 should be removed. On the other hand, it is preferred that the stocks 4' are mounted in respective holes 17 to give greater support to the chassis. Of course, this object can also be achieved by a bolt connection between the two leg members 2, 3 of the U-shaped chassis. When loading a container onto the trailer it should always be seen that a portion of the container protrudes beyond the back of the trailer, which is the case when proceeding in accordance with the method according to the invention. When unloading support stocks are used which have a height somewhat greater than the height of the trailer load supporting surface, and the trailer is caused, by means of the operating mechanism 6, 7, to adopt a position in which it slopes downwards towards the coupling arm 5 (as shown in FIG. 6), whereafter the support stocks are inserted under at least each corner of the container which protrudes beyond the back of the trailer. The front portion of the trailer is then raised by means of the operating mechanism 6, 7, sufficiently to allow the support stocks to be inserted under the front portion of the container (as shown in FIG. 7). Subsequent to bringing the trailer into a substantially horizontal position by means of the operating mechanism 6, 7 the stocks 4', if used binding together the leg members 2, 3, can be removed and the trailer moved away.

When loading a container shored in the manner obtained when unloading according to the method just described, the same method of procedure is adopted, but with the exception that all measures are inverted and effected in the reverse order.

Although the invention has been described in connection with one embodiment of the same, it can be varied arbitrarily within the scope of the following claims.

I claim:

1. A trailer for transferring loads comprising: a substantially U-shaped frame, having horizontal leg members, a wheel on each of the leg members, removable support means extending between the leg members comprising beams having eccentric grooves, the U-shaped frame having openings that are capable of accommodating the eccentric grooves, coupling arm means pivotally attached to the U-shaped frame, and control means operatively connected to the coupling arm means and frame to provide a relatively vertical rotation for varying the angle between the coupling arm means and the U-shaped frame to aid in transferring of the load.

2. A trailer for transferring loads comprising: a substantially U-shaped frame, having horizontal leg members, a wheel on each of the leg members, removable keel trestles capable of being mounted between the leg members and beams for locking the keel trestles in place, the leg members and beams for locking the keel trestles in place, the leg members having slots to accommodate the beams, coupling arm means pivotally attached to the U-shaped frame, and control means operatively connected to the coupling arms means and frame to provide a relative vertical rotation for varying the angle between the coupling arm means and the U-shaped frame to aid in transferring of the load.

3. A trailer for transferring loads comprising: a substantially U-shaped frame, having horizontal leg members, a wheel on each of the leg members, removable support means extending between the leg members, coupling arm means pivotally attached to the U-shaped frame, control means operatively connected to the coupling arm means and frame to provide a relative vertical rotation for varying the angle between the coupling arm means and the U-shaped frame to aid in transferring of the load, and shoring means adapted to cooperate with the trailer frame comprising a first support stock having a width smaller than the distance between the leg members of the U-shaped frame and a second support stock having collapsible side support members whereby the support stocks support the load when the trailer is being unloaded or loaded.

4. A trailer transferring loads comprising; a frame having a shape substantially in the form of a double U with one U member located inside of the other to provide parallel legs, a shaft mounted on each pair of parallel legs, at least one wheel attached to each shaft to provide a pivot point with respect to the frame, at least one removable support beam, and at least one removable support keel trestle capable of being mounted between the legs of the inner U member, the legs having slots to accommodate the beam for locking the keel trestle to the frame.

5. A trailer according to claim 1, where the control means is a hydraulic jack.

6. The method of unloading a boat from a trailer having a U-shaped frame, coupling arm, removable supports and collapsible support members comprising: the steps of rotating the U-shaped frame downward relative to the coupling arm, placing a first stock support under the keel of the boat adjacent the stern thereof; rotating the U-shaped frame upward until the boat is supported on the stock, removing the collapsible support members which are not supporting the boat, removing a keel support on the U-shaped frame, placing second stock support under the keel, rotating the U-shaped frame downward until the boat is supported only by the stocks, removing the removable supports that are located between the legs of the U-shaped frame, and the remaining collapsible supports, whereupon the trailer can be removed from the unloaded boat.